United States Patent [19]

Tanaka

[11] Patent Number: 4,576,288
[45] Date of Patent: Mar. 18, 1986

[54] CARD SORTING MACHINE
[75] Inventor: Tomomasa Tanaka, Tokyo, Japan
[73] Assignee: Tanaka Seiko Co. Ltd., Tokyo, Japan
[21] Appl. No.: 595,974
[22] Filed: Apr. 2, 1984
[30] Foreign Application Priority Data May 10, 1983 [JP]  Japan .............................. 58-69528[U]

[51] Int. Cl.[4] .......................... B07C 5/36; G06F 7/10
[52] U.S. Cl. ................................................... 209/609
[58] Field of Search ............... 209/547, 554, 608–613,
         209/636; 221/191, 192, 212; 271/18.1, 18.2

[56] References Cited

U.S. PATENT DOCUMENTS

| 2,379,943 | 7/1945  | Whitson          | 209/609 |
| 2,644,459 | 7/1953  | Schommer         | 209/609 |
| 3,191,802 | 6/1965  | Lasting          | 221/191 |
| 3,450,261 | 6/1969  | Kalthoff et al.  | 209/609 |
| 3,478,877 | 11/1969 | Parry            | 209/609 |
| 3,554,373 | 1/1971  | Rothfusz et al.  | 209/609 |
| 3,789,982 | 2/1974  | Russell          | 209/609 |
| 3,942,642 | 3/1976  | Yanagawa         | 209/610 |

FOREIGN PATENT DOCUMENTS 58-56153  12/1983  Japan .

Primary Examiner—Robert B. Reeves
Assistant Examiner—Edward M. Wacyra
Attorney, Agent, or Firm—Spencer & Frank

[57] ABSTRACT

In a card sorting machine, cards having coded tooth trains at the lower edges and magnetic pieces at the front edges are placed on a group of select bars. By selectively raising the select bars, the magnetic piece of the selected cards are attracted to a selecting magnet for having the cards moved at first for one pitch in the horizontal direction and then in an oblique upward direction. A card holding magnet is further provided which holds the selected cards at the oblique upward position upon transfer from the selecting magnet.

5 Claims, 6 Drawing Figures

CARD SORTING MACHINE

BACKGROUND OF THE INVENTION

The present invention relates to a card sorting machine for sorting a or plural desired card or cards from a group of cards each of the cards having coded toothed notches at its lower edge.

There have conventionally been proposed a number of such card sorting machines which use cards having toothed notches at their lower edges. For example, the machine shown in the U.S. Pat. No. 3,478,877 enables sorting of cards by a first separation of cards for moving a or plural selected card or cards in the horizontal direction for one pitch of a select bar and the subsequent or second separation in the same and further horizontal direction.

FIG. 1 shows a perspective view of a card sorting machine already proposed by the inventor of this invention (Japanese Patent Publication No. 56153/1983). According to the machine shown, when the second or subsequent separation, referred to in the above-mentioned conventional machine, is made, the card(s) is moved into different direction than that of the above U.S. patent. The structure of the machine of FIG. 1 is explained at first. A group of cards 4 each having coded toothed notches at the lower edge and a magnetic piece at the front edge are placed on a group of select bars in a housing. By the input of a code from a keyboard, not shown, select bars are selectively raised.

Cards to be selected are those not caught by the raised select bars, and by a selecting magnet being fixed to a selecting magnet mounting stand 13 the selected cards are moved in the horizontal direction for one pitch of the select bar (first separation). By moving the card selecting magnet mounting stand 13 in the upper forward direction, the selected card is moved into the upper forward direction, while remaining other cards not selected.

The above-mentioned card sorting machine has widely been used for sorting a large number of drawings. In such usage, the drawings are at first photographed on micro-films and each of the drawings is attached to a card of the aperture type, so that the cards with the micro-film may be sorted.

According to the card sorting machine of the type, however, selected cards must be removed each time by the operator of the machine. In other words, if the cards are not removed off the machine, they return to the original position on the select bars when the selecting magnet mounting stand 13 is returned to the position shown in FIG. 1.

Therefore, for carrying out the sorting processes for many kinds of cards at one time, the operator must input a code from the operating desk, not shown, to carry out the sorting, and then removing the selected cards after sorting; and for the next process he must again input next code and remove the then selected cards.

An object of this invention is therefore to provide a card sorting machine suitable for continuous sorting.

SUMMARY OF INVENTION

In the card sorting machine according to this invention, cards having coded toothed notches at the lower edges thereof and magnetic pieces at the front edges thereof are placed on a group of select bars. By selectively raising the select bars, the magnetic pieces of the selected cards are attracted to the selecting magnet, and at first moved for one pitch of a select bar (first separation). The machine of this invention further includes a card holding magnet disposed in parallel with the card selecting magnet thereabove, a card raising plate movable from the lower edge of the card near the magnetic piece of the card upwardly, and mechanism for driving the card raising plate to push up the card raising plate to disengage the card from the selecting magnet and connect the card with the card holding magnet.

EXPLANATION OF EMBODIMENTS

Figure 1:
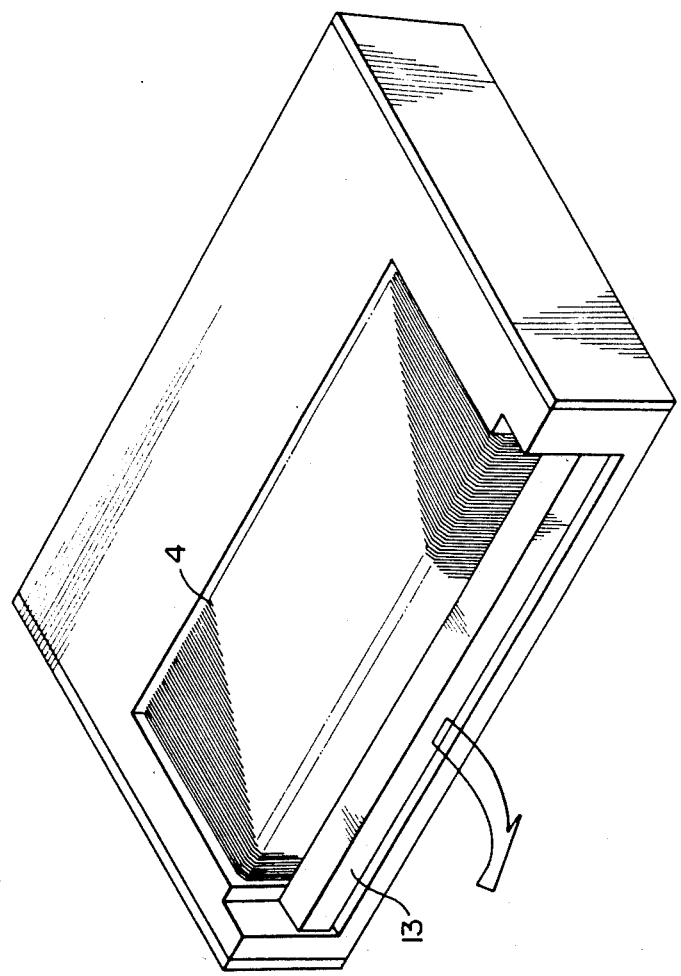
FIG. 1 is a perspective view of the conventional card sorting machine showing its general appearance.

The first embodiment of the card sorting machine according to this invention is explained with reference to FIGS. 2 and 3.

On a card receiving stand 1, a number of card selecting bars 2 and a lock bar 3 are provided, and they are engageable with and detachable from the notches provided at the lower edges of the cards.

To a cam shaft 35 to which the rotation of the motor, not shown, is transmitted, are fixed a reset cam 9 for resetting the selecting bars 2, selecting magnet regulation cams 6 for moving a selecting magnet 5, a locking cam 7 for controlling the lock bar 3, and a switch cam 8 for controlling a switch, not shown. With one rotation of the cam shaft 35 from its position shown in FIG. 2, these cams are also rotated for one turn, and enable a series of control necessary for sorting.

The selecting magnet 5 is fixed to a magnet mounting stand 13 and at the both ends are mounted a pair of arm plates 12. On each of the arm plates 12 there are provided rollers 21 and 22, respectively, the rollers being supported by guide groove 16 of a frame, not shown. Assembly consisting of the selecting magnet 5, magnet mounting stand 13 and the arm plates 12 is constructed so that the selecting magnet 5 touches magnetic pieces 4a of the cards 4 to attract them, moves the cards to left, of the figure, for a predetermined distance and is then guides to move subsequently obliquely in the upper direction (second separation). The assembly is normally urged to right (of the figure) by a spring 19 fixed at its one end to the arm plate 12. The movement of the assembly is started by the rotation of the selecting magnet regulating cam 6 fixed to the cam shaft 35.

Selecting magnet driving levers 14 are swingably supported by a shaft 42. The central portions of the levers 14 support rollers 23 at a shaft 40, the rollers 23 touching the cam face of selecting magnet regulation cams 6. The lower ends of the selecting magnet driving levers 14 and the right edges of the arm plates 12 are linked with link levers 15.

As is well known, the select bars 2 are selectively raised for selecting a or plural desired card or cards, and it is necessary to be reset after moving the card or cards for one pitch of the select bar. The reset is made by resetting mechanism comprising the reset cam 9, roller 24, reset lever 17, and reset lever connecting plate 18.

Controlling of the lock bar 3 is made with the locking cam 7 fixed to the cam shaft 35. To a shaft 41 rotatably supported on the frame, not shown, there are fixed a lever 11 and the locking lever 10. The rotation of the locking cam 7 is transmitted to the lever 11 through a roller 25 and the end of the locking lever 10 touches the lock bar 3 to raise it.

Figure 3:
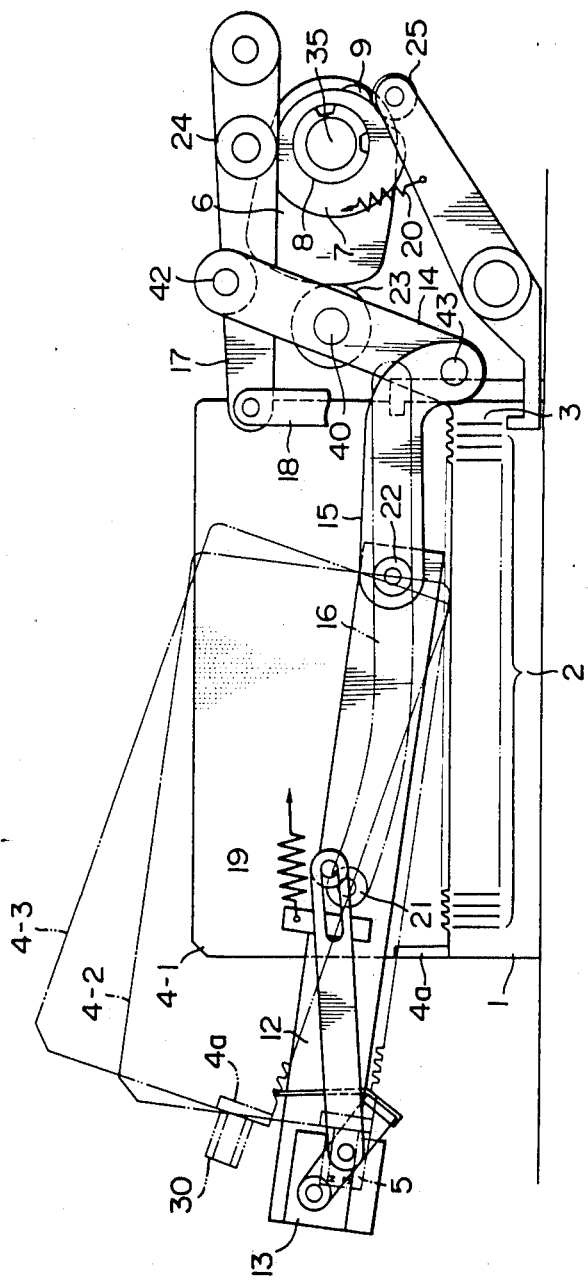

The card holding magnet 30 is fixed so that it lies vertically with respect to the sheet of FIG. 3 and in parallel with the selecting magnet 5, when the second separation of the selected cards is finished, which is shown in FIG. 3. A card raising plate supporting arm 33 is swingably supported at its bottom on the selecting magnet mounting stand 13 at a shaft 36. A card raising plate 31 is fixed to one end of the selecting magnet mounting stand 13. The central drum portion of the card raising plate supporting arm 33 and one end of a raising association lever 32 are connected by the shaft 35. At the other end of the raising association lever 32 there is provided a slot 32a, which is mounted on a shaft 34 fixed to the frame, not shown. The assembly consisting of the card raising plate supporting arm 33 and the raising association lever 32 is given a force for always urging the card raising supporting arm 33 in the anti-clockwise direction. By constructing the forward end edge of the card raising plate 31 to be hooked to the notches at the lower edges of the cards already secondly separated, good operation is obtained.

The operation of the card sorting machine as constructed above are explained hereinafter.

For easy understanding, the card before sorting is called as card 4-1, that secondly separated as card 4-2 and that held by the card holding magnet 30 as card 4-3.

Figure 2:
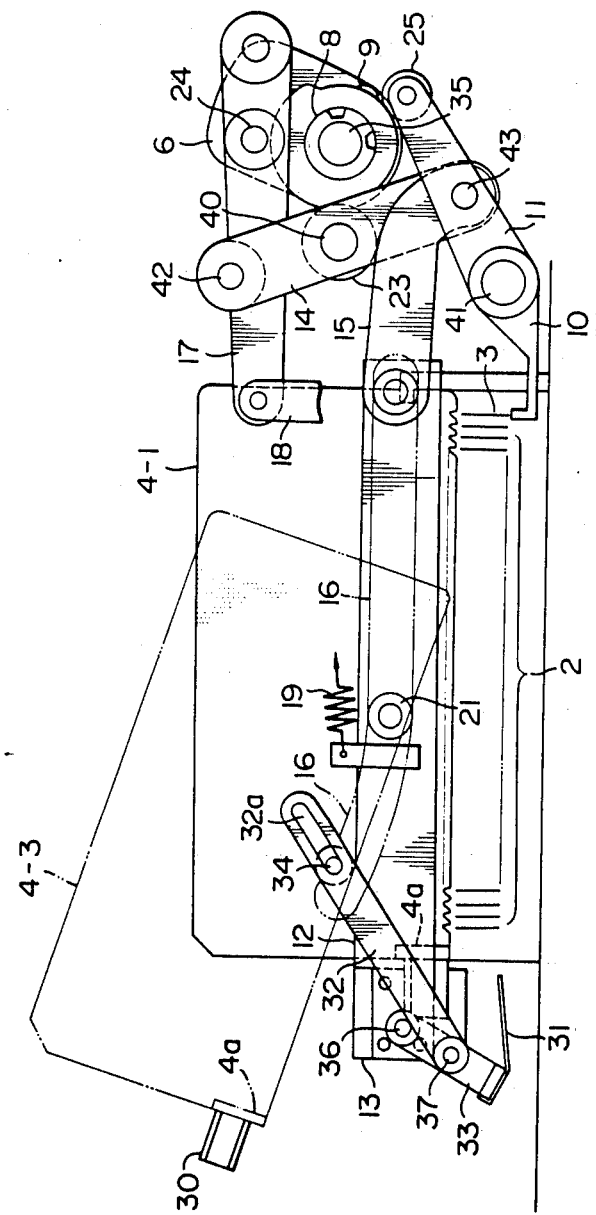
FIGS. 2 and 3 are views for explaining the operation of a first embodiment of the card sorting machine according to this invention.

FIG. 2 shows the device at the time of completion of one cycle of sorting operation and after the card 4-3 has been held by the card holding magnet 30 with the aid of the card raising plate 31 and just before initiating the next sorting cycle. At this time, the selecting magnet 5 is at its leftmost position, while the select bars 2 and the lock bar 3 are at their lower position. On the other hand, the card raising plate supporting arm 33 is at its most limited movable position in the anti-clockwise direction.

When a code is input from the operating desk, designated select bars 2 rise. And subsequently the cam shaft 35 starts to rotate in the clockwise direction, and the magnet driving levers 14 is somewhat pushed in the anti-clockwise direction by the selecting magnet regulating cams 6.

Accordingly, the link levers 15 push the arm plates 12, so that the selecting magnet mounting stand 13 and the selecting magnet 5 fixed thereto may be moved to left for one pitch of the code tooth.

By this movement of the selecting magnet 5, a card or cards selected by the select bars 2, that is, a card or cards allowed to move to left, are moved to left for one pitch. This is called the first separation.

At this time, the card raising plate supporting arm 33 moves to left together with the selecting magnet mounting stand 13, but its angular position against the stand 13 is not changed.

By the further rotation of the cam shaft 35, the roller 25 of the lever 11 is pushed downwardly by the locking cam 7, and accordingly the lock lever 10 is rotated in the clockwise direction to raise the lock bar 3. With this action, the card already moved to left at the first separation is pushed up a little, while the remaining cards or those not selected are held, engaged with the notches of the cards and the lock lever 3.

By the further rotation of the cam shaft 35, the reset cam 9 raises the reset lever 17 to reset the select bars 2 which are in the raised position. The selecting magnet regulating cams 6 are rotated integrally with the cam shaft 35, but the range of lift is not changed at this stage and the selecting magnet 5 is at the position moved to left for one pitch of the code tooth. By the further rotation of the cam shaft 35, the magnet driving levers 14 are rotated in the anti-clockwise direction by the selecting magnet regulating cams 6, so that the link levers 15 push the arm plates 12. Accordingly, the selecting magnet mounting stand 13 and the selecting magnet 5 fixed thereto are rotated obliquely in the upper oblique direction. Therefore, the cards selected by the selecting magnet 5 are moved to the position of 4-2 shown in FIG. 3. At the initial stage of the above rotational raising movement, the card raising plate 31 moves almost integrally with the selecting magnet mounting stand 13 without changing the angular position with respect thereto, but after the slot 32a of the raising association lever 32 is limited its movement by the shaft 34, the card raising plate supporting arm 33 starts to rotate in the anti-clockwise direction, so that the card raising plate 31 pushes up the lower edge of the card and finally it releases the card from the selecting magnet 5. And it pushes the card towards the card holding magnet 30 so that the magnetic piece 4a of the card 4-3 is attracted to the card holding magnet 30.

At this state, the assembly of the selecting magnet 5 is returned to the state shown in FIG. 2. The card raising plate 31 is also automatically returned to the state of FIG. 2, while remaining the card 4-3 in the held state shown in FIG. 3.

The second embodiment of this invention is now explained with reference to FIG. 4.

In this and subsequent embodiments of this invention, the card holding machanism for cards after the second separation may be constructed independently from the sorting mechanism, thus enabling any combination of the card holding mechanism of these embodiments with the sorting mechanism explained with reference to FIG. 1 may be provided. In the second embodiment of this invention, the structure for the first separation and the second separation is the same as those explained with FIGS. 2 and 3, and therefore the explanation will not be repeated here again.

Figure 4:
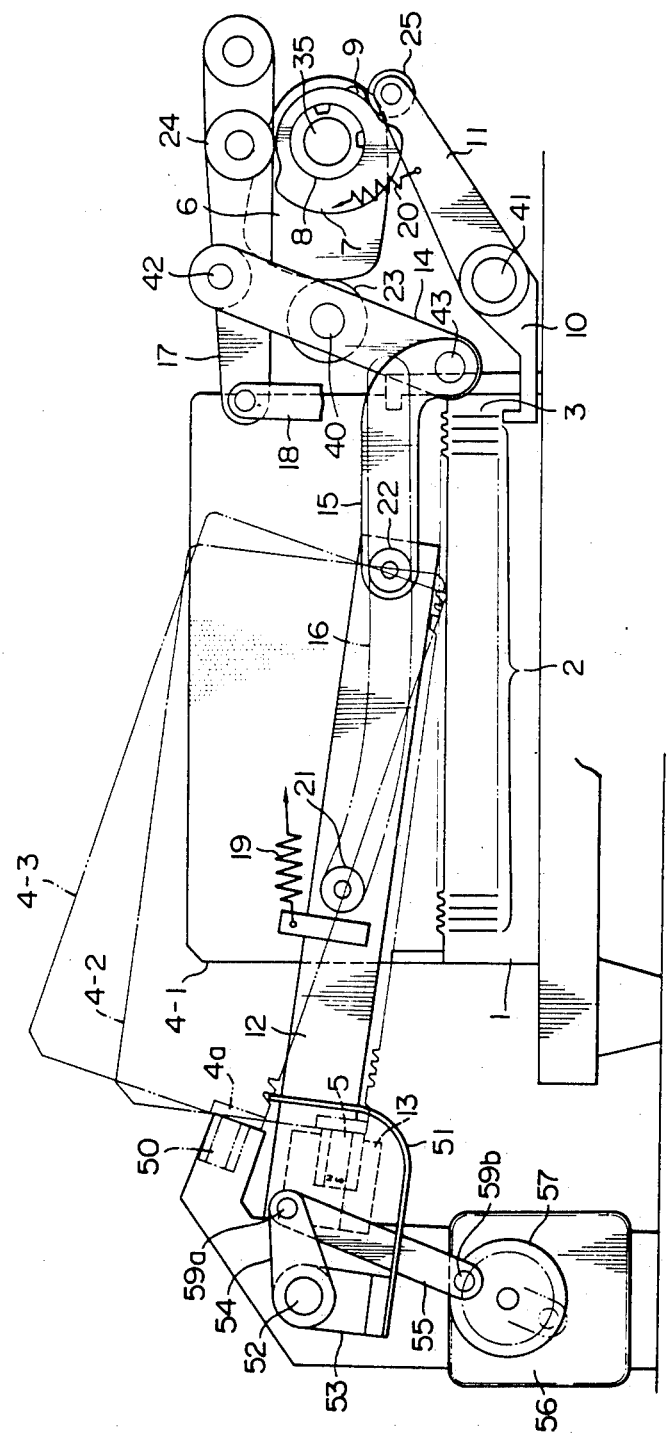
FIG. 4 is a view for explaining the operation of a second embodiment of the card soring machine according to this invention.

In FIG. 4, a card holding magnet 50 is fixed to the raising plate structure side, and as clearly shown in the figure, the magnet 50 is disposed above the selecting magnet 5 and in parallel therewith, or in other words vertically to the sheet face of the figure. A supporting arm shaft 52 is rotatably supported to a frame at the motor 56 side. A card raising plate supporting arm 53 and the linking arm 54 are fixed to the supporting arm shaft 52.

To the card raising plate supporting arm 53 is fixed a card raising plate 51. An eccentric disc 57 and one end of a crank arm 55 fixed to the output shaft of the motor 56 are linked at a shaft 59b, while the other end of the crank arm 55 are linked with the linking arm 54 at a shaft 59a.

After the second separation of a card, the motor 56 is rotated in the anti-clockwise direction, so as to bring the card 4-2 into the position of card 4-3. After that, the motor 56 is rotated from the position shown in FIG. 4 in the clockwise direction, to bring the top end of the card raising plate 51 downwardly.

Figure 5:
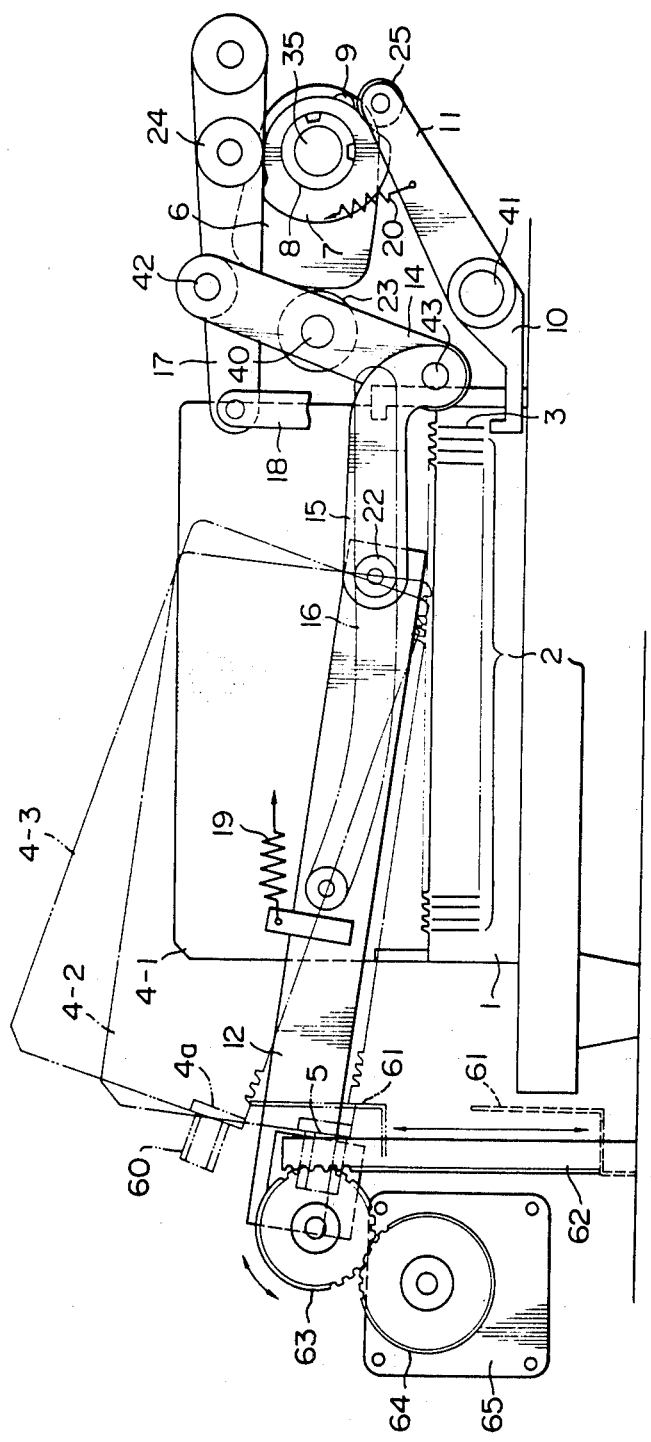
FIG. 5 is a view for explaining the operation of a third embodiment of the card sorting machine according to this invention.

A third embodiment of the card sorting machine according to this invention will now be explained with reference to FIG. 5.

In this embodiment, a card holding magnet 60 is fixed to the structure of the raising plate side and as shown in the figure, the magnet 60 is disposed at the position above the selecting magnet 5 and in parallel therewith, or in other words vertically to the sheet of the figure. At the output shaft of a motor 65 is fixed a gear 64 meshed with a gear 63. The gear 63 is meshed with a raising rack 62, which is fixed to a card raising plate 61. The rack 62 is fixed movably in the up and down directions, while the card raising plate 61 is raised or lowered by the rotation of the motor 65.

After the second separation by the card sorting mechanism, the motor 65 is rotated to move the card raising plate 61 from the position of a broken line to that of a chain line, so that the card may be held by the card holding magnet 60. On the other hand, the card raising plate 61 is returned to the broken line position by the adverse rotation of the motor 65.

Figure 6:
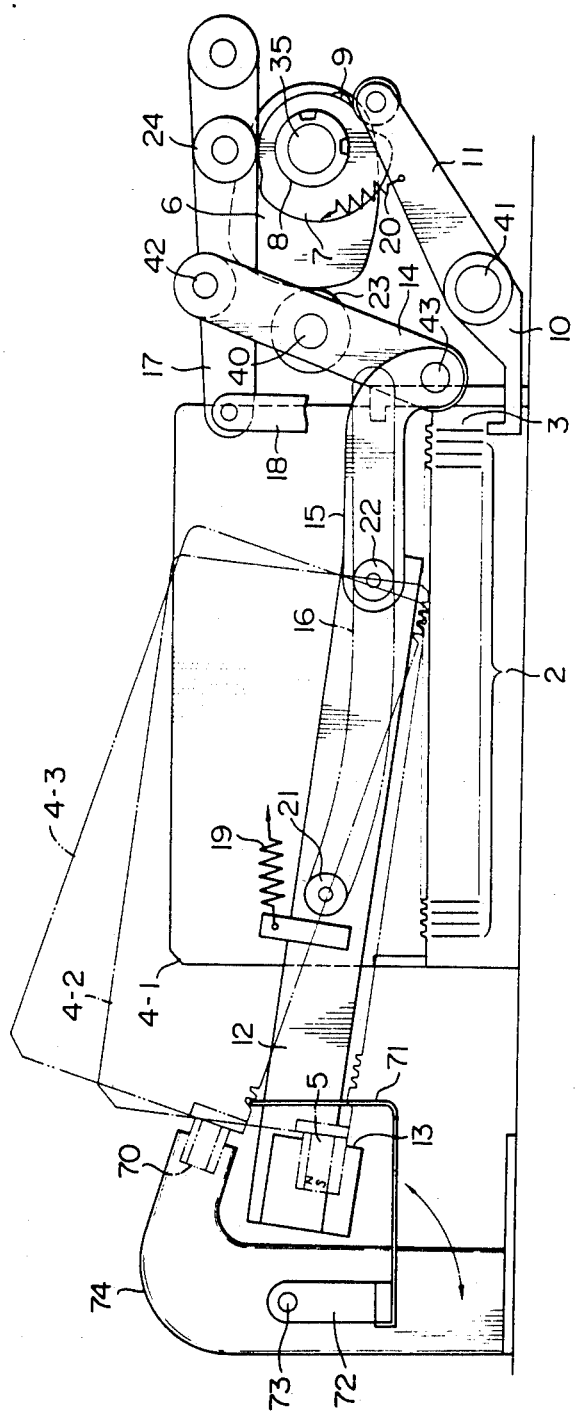
FIG. 6 is a view for explaining the operation of a fourth embodiment of the card sorting machine according to this invention.

A fourth embodiment of the card sorting machine according to this invention will be explained with reference to FIG. 6.

A card holding magnet 70 is fixed to a frame structure of the raising plate side and it is disposed above the selecting magnet 5 and in parallel with the magnet at the time of completion of the second separation. A card raising arm 72 supporting a card raising plate 71 is rotatably supported to the frame structure 74 at a shaft 73.

After the second separation by the card sorting mechanism, the raising arm 72 is rotated to have the card holding magnet 70 hold the card.

As fully explained above, according to the present invention, the card or cards after the second separation may be moved off from the selecting magnet by moving the card raising plate to have the card holding magnet hold the card or cards. By the return of the selecting magnet to its initial operational position, the card or cards held by the card holding magnet may not be returned to the initial position. Therefore, the selected cards need not be removed before initiating the next sorting operation.

It accordingly enables the continuous sorting by inputting a series of codes from the operating board and after completion of the whole operation, all the selected cards 4-3 may be removed.

What is claimed is:

1. In a card sorting machine having a number of selectively raisable select bars supporting thereon a number of coded cards, each of the cards having a coded tooth train at the lower edge thereof and a magnetic piece attached at its front edge and a selecting magnet to move selected coded cards for one pitch of the select bar in the horizontal direction by attracting thereto the magnetic piece and to further move said selected coded cards in an oblique upward direction, while stopping unselected cards, the card sorting machine further comprising:

a card holding magnet provided above and in parallel with the selecting magnet at the time of the separation of the selected coded cards in the oblique upward direction;

a card raising plate movable from a lower position near the magnetic piece of the selected coded cards already separated in the oblique upward direction to an upper position; and a card raising plate driving mechanism to raise the card raising plate to release the selected coded cards attracted to the card selecting magnet at the time when moved in the oblique upward direction and to have said selected coded cards held by the card holding magnet.

2. A card sorting machine according to claim 1, wherein the card raising plate driving mechanism drives the card raising plate, synchronously with the further oblique upward movement of the selecting magnet.

3. A card sorting machine according to claim 1, wherein the card raising plate driving mechanism comprises a motor which rotates when the further oblique upward movement of the selected coded cards is finished and a link mechanism which drives the plate by changing the rotation of the motor to the upward movement.

4. A card sorting machine according to claim 1, wherein the card raising plate driving mechanism comprises a motor, a gear connected with the motor and a rack connected with the gear and supported movably in upward and downward directions, the card raising plate being fixed to the rack.

5. A card sorting machine according to claim 1, wherein the card raising plate driving mechanism is a lever rotatably supported to a frame of the machine, the card raising plate being raised when an operator rotates the lever.

* * * * *